United States Patent Office 3,119,653
Patented Jan. 28, 1964

3,119,653
PREPARATION OF URANIUM MONOSULFIDE
Kazuhiko Yoshioka, Westmont, Ill., assignor to the United States of America as represented by the United States Atomic Energy Commission
No Drawing. Filed Oct. 5, 1962, Ser. No. 228,772
6 Claims. (Cl. 23—14.5)

This invention deals with the preparation of uranium monosulfide. Uranium monosulfide has utility as fuel for nuclear reactors, because it has a high uranium concentration and is refractory.

Uranium monosulfide has been produced heretofore by passing hydrogen sulfide into uranium powder (produced, for instance, by alternately hydriding and dehydriding uranium metal), whereby uranium disulfide is formed, mixing the uranium disulfide with uranium powder and reacting the mixture at about 1800° C. either in a vacuum or argon atmosphere.

It is an object of this invention to provide a process for the preparation of uranium monosulfide which does not require the preparation of uranium metal powder.

It is another object of this invention to provide a process for the preparation of uranium monosulfide which is considerably simpler than the process predominantly used heretofore and in which the monosulfide is obtained directly.

It also is an object of this invention to provide a process for the preparation of uranium monosulfide which can be carried out at relatively low temperatures.

The process comprises dissolving uranium tetrafluoride in a molten mixture of alkali metal chloride, such as a potassium chloride-sodium chloride mixture, passing a gaseous mixture of hydrogen sulfide and hydrogen through the molten uranium tetrafluoride solution, whereby uranium monosulfide is formed and precipitated from the salt, and separating the uranium monosulfide from the salt.

The alkali metal chloride is preferably of low melting or eutectic composition, which in the case of sodium-potassium chloride is about equimolar composition. The reaction temperature may range from 700 to 950° C., but a temperature of about 850° C. is preferred. About equimolar quantities of hydrogen and hydrogen sulfide should be used; however, a slight excess of hydrogen is suitable. Separation of the precipitated uranium monosulfide can be carried out by any means known to those skilled in the art, for instance by decantation or by mechanical means after solidification.

The uranium monosulfide obtained by the process of this invention can then be formed into shapes as desired by sintering. This can be done with or without the addition of a binder known in the art. For instance, carbowax in a quantity of about 1% was found satisfactory for this purpose. Sintering has to be carried out in vacuum or in an inert atmosphere, such as argon, at between 1700 and 2050° C. This sintering step is not part of this invention.

In the following, an example is given for illustrative purposes.

Example

Ten grams of uranium tetrafluoride were added to 90 grams of an equimolar sodium chloride-potassium chloride mixture in a graphite crucible. The temperature was raised to 850° C. and an atmosphere of argon was maintained, whereby the salt melted and the uranium tetrafluoride was dissolved. Thereafter an equimolar mixture of hydrogen and hydrogen sulfide gas was bubbled through the molten reaction mass by means of graphite tubes. Immediately the temperature of the salt started to rise, indicating reaction. This gas current was maintained for about four hours.

Thereafter the mass was allowed to cool to room temperature and to solidify. The heavy dark grey bottom layer was broken off the upper salt layer and a small quantity thereof was leached with water to remove any adhering chloride. An X-ray pattern was made of the grey powder; it showed the lines of uranium sulfide and of uranium oxysulfide. Under the microscope a few black crystals of uranium oxysulfide were observed in the light bright crystals of uranium sulfide. The yield was about 70% on the basis of the uranium tetrafluoride added.

A longer reaction time would bring about an increased yield. Also, the salt can be used several times whereby the total yield is increased. If the reaction is carried out under the exclusion of air or other oxygen-containing atmosphere, pure uranium sulfide can be obtained.

It will be understood that the invention is not to be limited to the details given herein but that it may be modified within the scope of the appended claims.

What is claimed is:
1. A process of preparing uranium monosulfide, comprising dissolving uranium tetrafluoride in molten alkali metal chloride; passing a gaseous mixture of hydrogen and hydrogen sulfide through the molten uranium tetrafluoride solution, whereby uranium monosulfide is formed and precipitated; and separating the uranium monosulfide from the salt.
2. The process of claim 1 wherein the alkali metal chloride is a mixture of potassium chloride and sodium chloride.
3. The process of claim 2 wherein the alkali metal chloride has about equimolar composition.
4. The process of claim 1 wherein the reaction is carried out at between 700 and 950° C.
5. The process of claim 1 wherein the reaction is carried out under exclusion of oxygen.
6. The process of claim 1 wherein the mixture of hydrogen and hydrogen sulfide has about equimolar composition.

No references cited.